US012467073B2

(12) United States Patent
Küchler et al.

(10) Patent No.: US 12,467,073 B2
(45) Date of Patent: Nov. 11, 2025

(54) METHODS FOR PRODUCING PLASMID DNA

(71) Applicant: RICHTER-HELM BIOLOGICS GMBH & CO. KG, Hamburg (DE)

(72) Inventors: Michael Küchler, Hamburg (DE); Christian Kaiser, Hamburg (DE); Björn Krüger, Hamburg (DE)

(73) Assignee: RICHTER-HELM BIOLOGICS GMBH & CO. KG, Hamburg (DE)

( * ) Notice: Subject to any disclaimer, the term of this patent is extended or adjusted under 35 U.S.C. 154(b) by 637 days.

(21) Appl. No.: 17/916,282

(22) PCT Filed: Mar. 31, 2021

(86) PCT No.: PCT/EP2021/058337
§ 371 (c)(1),
(2) Date: Sep. 30, 2022

(87) PCT Pub. No.: WO2021/198281
PCT Pub. Date: Oct. 7, 2021

(65) Prior Publication Data
US 2023/0175031 A1 Jun. 8, 2023

(30) Foreign Application Priority Data
Mar. 31, 2020 (EP) .................... 20167238

(51) Int. Cl.
*C12N 15/10* (2006.01)
*C12P 19/34* (2006.01)
(52) U.S. Cl.
CPC .......... C12P 19/34 (2013.01); C12N 15/1006 (2013.01)

(58) Field of Classification Search
None
See application file for complete search history.

(56) References Cited

U.S. PATENT DOCUMENTS

| 9,017,966 | B2 * | 4/2015 | Williams | C12N 15/73 |
| | | | | 435/69.1 |
| 2007/0111221 | A1 * | 5/2007 | Blanche | C12N 15/1003 |
| | | | | 435/5 |

FOREIGN PATENT DOCUMENTS

| WO | WO 99/37750 | 7/1999 |
| WO | WO 01/79486 | 10/2001 |
| WO | WO 2004/024283 | 3/2004 |

(Continued)

OTHER PUBLICATIONS

International Search Report corresponding to International Application No. PCT/EP2021/058337 dated Jun. 24, 2021.

(Continued)

*Primary Examiner* — Aaron A Priest
(74) *Attorney, Agent, or Firm* — Jenkins, Taylor & Hunt, P.A.

(57) ABSTRACT

The present invention relates to a method of isolating covalently closed circular (ccc) DNA molecules from microbial cells containing the ccc DNA molecules, comprising the steps of: contacting the microbial cells with a lysing agent and moving the composition through a tube system with a flow having a Reynolds number of at least 3000 to obtain a lysing composition, incubating the lysing composition to obtain a lysate, contacting the lysate with a neutralizing solution to obtain a neutralized lysate, and further processing the neutralized lysate to obtain the ccc DNA molecules.

20 Claims, 2 Drawing Sheets

(56) References Cited

FOREIGN PATENT DOCUMENTS

Figure 1:
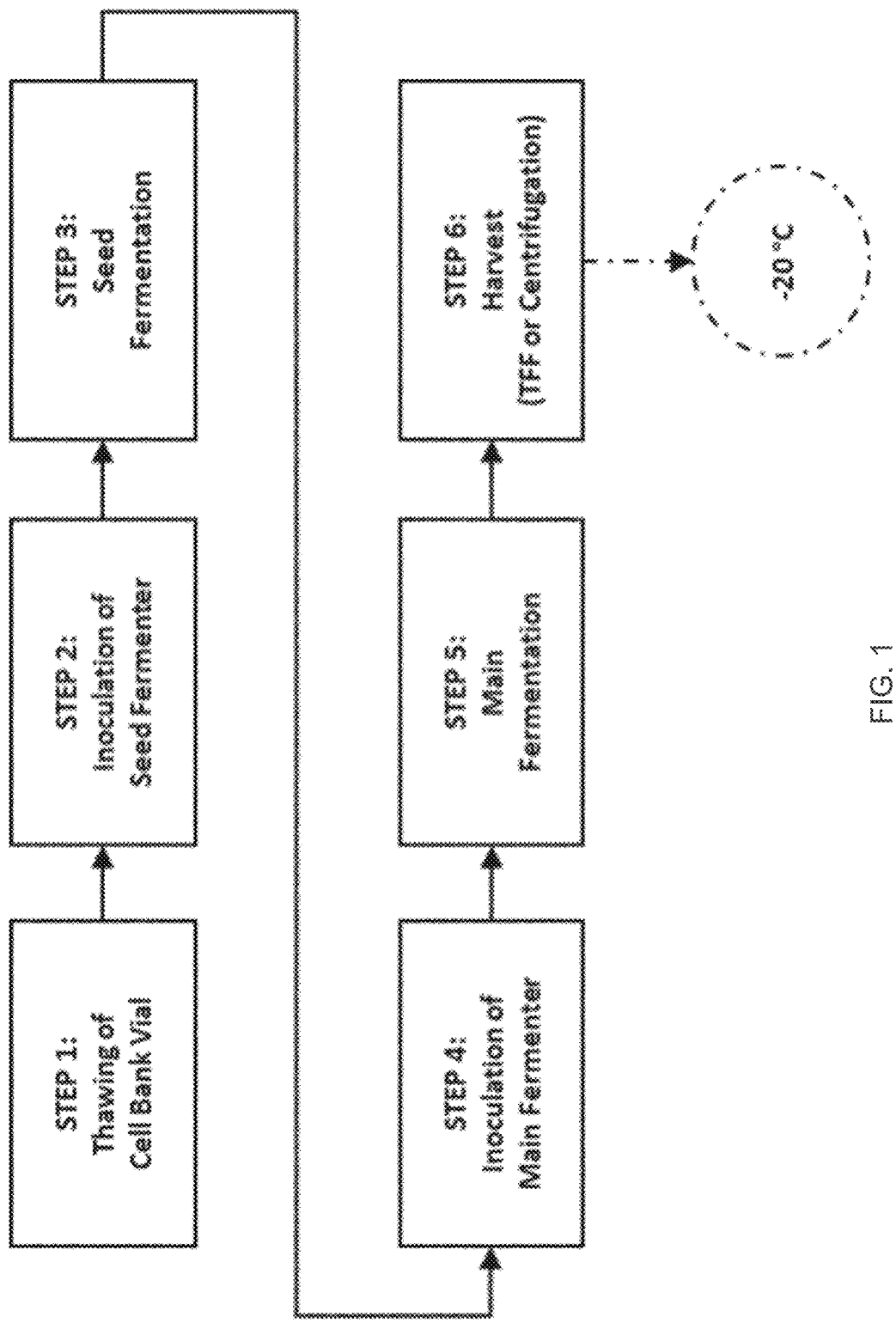

| WO | WO 2004/060277 | 7/2004 |
|---|---|---|
| WO | WO 2005/026331 | 3/2005 |

OTHER PUBLICATIONS

Meacle et al., "Impact of engineering flow conditions on plasmid DNA yield and purity in chemical cell lysis operations," Biotechnology and Bioengineering, vol. 87, No. 3, pp. 293-302 (Aug. 5, 2004).
Written Opinion corresponding to International Application No. PCT/EP2021/058337 dated Jun. 24, 2021.

* cited by examiner

METHODS FOR PRODUCING PLASMID DNA

FIELD OF THE INVENTION

The present invention relates to a method of isolating covalently closed circular (ccc) DNA molecules from microbial cells containing the ccc DNA molecules, comprising the steps of: contacting the microbial cells with a lysing agent and moving the composition through a tube system with a flow having a Reynolds number of at least 3000 to obtain a lysing composition, incubating the lysing composition to obtain a lysate, contacting the lysate with a neutralizing solution to obtain a neutralized lysate, and further processing the neutralized lysate to obtain the ccc DNA molecules.

BACKGROUND OF THE INVENTION

Ccc DNA molecules, in particular plasmids are necessary for the production of therapeutic molecule, in particular for the production of antibodies or therapeutic nucleotide sequences. E.g. for the production of therapeutic antibodies, large quantities of ccc DNA molecules are required. Methods for production and purification of plasmid DNA are for example provided in WO 2004/060277, WO 01/79486 or WO 2005/026331. However, improved methods for purifying plasmid DNA are needed which achieve high purity and yield of ccc DNA molecules.

OBJECTIVES AND SUMMARY OF THE INVENTION

Thus, there is a need for an improved ccc DNA manufacturing process, in particular leading to high yield.

To meet this need the invention provides a method of isolating covalently closed circular (ccc) DNA molecules from microbial cells containing the ccc DNA molecules, comprising the steps of:
  a) contacting the microbial cells with a lysing agent and moving the composition through a tube system with a flow having a Reynolds number of at least 3000 to obtain a lysing composition;
  b) incubating the lysing composition to obtain a lysate;
  c) contacting the lysate with a neutralizing solution to obtain a neutralized lysate; and
  d) further processing the neutralized lysate to obtain the ccc DNA molecules.

Also envisaged is a method of producing ccc DNA molecules in microbial cells, comprising the steps of:
  (i) fermenting microbial cells containing the ccc DNA molecules;
  (ii) harvesting the microbial cells;
  a) contacting the microbial cells with a lysing agent and moving the composition through a tube system with a flow having a Reynolds number of at least 3000 to obtain a lysing composition;
  b) incubating the lysing composition to obtain a lysate;
  c) contacting the lysate with a neutralizing solution to obtain a neutralized lysate; and
  d) further processing the neutralized lysate to obtain the ccc DNA molecules.

The inventors found that when after contacting the microbial cells with the lysing agent, i.e. in the mixing tube before the lysing step c), the flow has a Reynolds number of at least 3000 the yield of the ccc DNA molecules can be increased.

In particular the inventors found that when a Reynolds number of at least 3000 is applied in step a) the yield of the ccc DNA molecules can be increased.

Typically, the lysis step b) lasts 6 minutes or less, preferably 2 to 6 minutes, more preferably 3 to 6 minutes.

In one embodiment, the total duration of step a) and step b) is 6 minutes or less, preferably 2 to 6 minutes, more preferably 3 to 6 minutes.

Step d) comprises filtering the neutralized lysate by at least one filtration step.

In some embodiments in step d) an alluvial filtration step is performed, preferably using diatomaceous earth. In addition an ultrafiltration/diafiltration step may be performed, wherein preferably the ultrafiltration/diafiltration filter is a hollow fiber filter. Further earth alkali (e.g. $CaCl_2$)) salt may be added to the neutralized lysate. After this precipitation a tangential flow filtration step may be performed. An anion exchange (AEX) chromatography may follow the tangential flow filtration. The sample may be further processed by adding potassium phosphate, such as di-potassium hydrogenphosphate or ammonium sulphate to the neutralized lysate. In addition a hydrophobic interaction chromatography or thiophilic interaction chromatography may be performed. An additional/diafiltration step may be performed. In one embodiment, step d) does not contain AEX chromatography.

Typically the diameter of the tube system in step a) may be in the range of 2 to 50 mm, preferably in the range of from 4 to 40 mm. In step (b) the lysing composition may be moved through a tube system having diameter in the range of from 2 to 50 mm, preferably in the range of from 5 to 30 mm. In case that a fermentation scale of 500 L-1000 L is performed the diameter might be increased, preferably to 30 to 40 mm. In step c) the lysate is moved through a tube system in the range of from 2 to 60 mm, preferably in the range of from 4 to 52 mm.

Typically, the flow in step a) has a flow rate in the range of from 0.3 to 1.5 m/s, preferably in the range of from 0.5 to 1.5 m/s. In step b) the lysing composition may be moved through the tube system with a flow having a flow rate in the range of from 0.05 to 1 m/s, preferably in the range of from 0.1 to 0.5 m/s. In step c) the lysate may be moved through the tube system with a flow having a flow rate in the range of from 0.3 to 1.5 m/s, preferably in the range of from 0.5 to 1.5 m/s.

In another embodiment with a scale of 500 L-1000 L, the flow in step a) has a flow rate in the range of from 0.05 to 1.5 m/s, preferably in the range of from 0.1 to 1.5 m/s. In step b) the lysing composition may be moved through the tube system with a flow having a flow rate in the range of from 0.01 to 1 m/s, preferably in the range of from 0.05 to 0.5 m/s. In step c) the lysate may be moved through the tube system with a flow having a flow rate in the range of from 0.05 to 1.5 m/s, preferably in the range of from 0.1 to 1.5 m/s.

Using the method of the invention a yield of ccc DNA molecules of at least 65% after step c) may be achieved. The homogeneity of the ccc DNA molecules obtained from step c) is at least 70% ccc, preferably 80%, more preferably at least 90% ccc.

In preferred embodiments, the method is performed at large scale.

Also contemplated are DNA molecules obtained by the method as described herein.

FIGURE LEGENDS

FIG. 1: Process Flow Fermentation and Cell Harvest
FIG. 2: Exemplary Lysis Set-up

DETAILED DESCRIPTION OF THE INVENTION

Before the invention is described in detail with respect to some of its preferred embodiments, the following general definitions are provided.

The present invention as illustratively described in the following may suitably be practiced in the absence of any element or elements, limitation or limitations, not specifically disclosed herein.

The present invention will be described with respect to particular embodiments and with reference to certain figures but the invention is not limited thereto but only by the claims.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group which preferably consists only of these embodiments.

Where an indefinite or definite article is used when referring to a singular noun, e.g. "a", "an" or "the", this includes a plural of that noun unless something else is specifically stated. The terms "about" or "approximately" in the context of the present invention denote an interval of accuracy that the person skilled in the art will understand to still ensure the technical effect of the feature in question. The term typically indicates deviation from the indicated numerical value of ±10%, and preferably of ±5%.

Technical terms are used by their common sense. If a specific meaning is conveyed to certain terms, definitions of terms will be given in the following in the context of which the terms are used.

The invention refers to a method of isolating covalently closed circular (ccc) DNA molecules from microbial cells containing the ccc DNA molecules, comprising the steps of:
a) contacting the microbial cells with a lysing agent and moving the composition through a tube system with a flow having a Reynolds number of at least 3000 to obtain a lysing composition;
b) incubating the lysing composition to obtain a lysate;
c) contacting the lysate with a neutralizing solution to obtain a neutralized lysate; and
d) further processing the neutralized lysate to obtain the ccc DNA molecules.

In addition, the invention refers to a method of producing ccc DNA molecules in microbial cells, comprising the steps of:
(i) fermenting microbial cells containing the ccc DNA molecules;
(ii) harvesting the microbial cells;
a) contacting the microbial cells with a lysing agent and moving the composition through a tube system with a flow having a Reynolds number of at least 3000 to obtain a lysing composition;
b) incubating the lysing composition to obtain a lysate;
c) contacting the lysate with a neutralizing solution to obtain a neutralized lysate; and
d) further processing the neutralized lysate to obtain the ccc DNA molecules.

Contacting the microbial cells with a lysing agent means that to the microbial cells a lysing agent is added. Typically, this means that the tube containing the microbial cells and optionally buffer and the tube containing the lysing agent are combined at a valve that leads to the mixing tube.

The inventors found that if composition containing the lysing agent and the microbial cells is moved through the system with Reynolds number of at least 3000, the yield of the ccc DNA after step c), i.e. in the neutralized lysate, is high, i.e. about above 60%, such as above 65%, 70%, 75%, 80%, 85%, 90%, 95%.

Incubating the lysing composition to obtain a lysate, means that when the lysing composition is achieved after mixing the microbial cells with the lysing agent, this composition is incubated for a certain incubation time. Thereby typically, the lysing composition is moved through a lysis tube for a certain time period. The lysing tube is typically directly connected to the mixing tube.

Covalently closed circular DNA molecule refers to a circular double-stranded DNA molecule which is intact, i.e. wherein both strands are uncut. The method of the invention refers in particular to methods of isolating and producing a covalently closed circular recombinant DNA molecule.

The circular (ccc) DNA molecule may be a plasmid, cosmid, bacterial artificial chromosome (BAC), bacteriophage, viral vector or hybrids thereof. Preferably the ccc DNA molecule is a plasmid. Typically the ccc DNA molecule has a size in the range of 2 kbp to 20 kbp.

The microbial cells may for example be bacterial cells, fungal cells, algae cells, slime mold cells, protozoan cells. Preferably, the microbial cells are fungal cell, such as yeast cells, or bacterial cells. More preferably, the microbial cells are bacterial cells. In the context of the present invention, microorganisms are particularly preferred which are able to replicate a ccc DNA molecule e.g. a plasmid. The bacterial cell may be a gram positive or a gram negative cell. Preferably, the bacterial cell is a gram negative bacterial cell. More preferably, the bacterial cell is *Escherichia coli* (*E. coli*).

Particularly preferred in this context are *E. coli* strains used for plasmid production e.g. DH1, DH5α, DH10B, Stb13 or JM109. In some embodiments particularly DH5alpha strains are preferred.

The terms "fermenting", "fermentation" or "fermentative production" refer to the bulk growth of microorganisms on a growth medium under aerobic or anaerobic conditions. Preferably, the fermentation reported herein refers to bacteria under anaerobic conditions. In the context of the present invention the terms particularly refer to fermentation processes in which a covalently closed circular recombinant DNA molecule comprising an origin of replication e.g. a plasmid is replicated by the microorganism.

Step a) Contacting with the Lysing Agent and Mixing

The microbial cells may be contacted with the lysing agent subsequent to fermentation or the microbial cells may be frozen and thawed after fermentation.

In some embodiments, the initial concentration of the microbial cells used in step a) is 30 to 250 g/L, preferably 50 to 150 g/L (referring to the concentration before contacting the microbial cells with the lysing agent). The initial concentration may be adjusted by a buffer, typically a physiological buffer having pH about 8.0 and comprising a substance that is capable to chelate divalent meal cations, such as $Mg^{2+}$ and $Ca^{2+}$ required for the function of DNA degrading enzymes (e.g. by the buffer denoted herein as LY1).

Step a) is initiated by contacting the microbial cells with the lysing agent. The lysing agent is a strong alkaline solution comprising a strong base, such as NaOH, and a detergent such as sodium dodecyl sulfate (SDS).

The composition of microbial cells and lysing agent typically has a viscosity in the range 1.2-1.3 mm$^2$/s (Capillary Viscometer Method according to Ph.Eu. 9.8, chapter 2.2.9).

The Reynolds number is used to describe different fluid flow situations. At low Reynold numbers, where viscous forces are dominant laminar flow occurs, characterized by smooth constant fluid motion. At high Reynold numbers, dominated by inertial forces, turbulence occurs.

For a flow in a circular tube, the Reynolds number us usually defined as $$Re = \frac{v_m \cdot d}{v}$$

Where $v_m$ is the velocity of the fluid average through the tube diameter
d is the inner diameter of the tube
v is the viscosity of the fluid.
The critical Reynolds numbers is $\approx 2040 \pm 10$.

The critical Reynolds number marks the transition between laminar and turbulent flow.

The inventors found that surprisingly a Reynolds number that is much higher than the critical number, i.e. a Reynolds number of at least 3000, at least 3300, preferably of 3500 to 6000, more preferably, of 4000 to 5500 leads to high yields of ccc DNA molecules.

Thus, in a specific embodiment, in step a) the Reynolds number is at least 3000, at least 3300, preferably of 3500 to 6000, more preferably of 4000 to 5500, such as 5000 to 5500.

Thereby a ccc DNA molecule yield of at least 70%, at least 75%, at least 80%, at least 85%, at least 90% (in reference to the total amount of produced recombinant DNA molecules) after the lysis, i.e. after the neutralization step c) can be achieved.

In some embodiments, the flow is turbulent throughout the complete lysis including neutralization. In other words, in steps a), b) and c) the composition is moved through a tube system with turbulent flow. In other words, the Reynolds number is at least 2100 in steps a), b) and c).

Hence in a specific embodiment, in step a) the Reynolds number is at least 3000, and in steps b) and c) the Reynolds number is at least 2100.

Hence, some embodiments refer to a method of isolating covalently closed circular (ccc) DNA molecules from microbial cells containing the ccc DNA molecules, comprising the steps of:
a) contacting the microbial cells with a lysing agent and moving the composition through a tube system with a flow having a Reynolds number of at least 3000 to obtain a lysing composition;
b) incubating the lysing composition to obtain a lysate and moving the composition through a tube system with a flow having a Reynolds number of at least 2100;
c) contacting the lysate with a neutralizing solution to obtain a neutralized lysate and moving the composition through a tube system with a flow having a Reynolds number of at least 2100;
d) further processing the neutralized lysate to obtain the ccc DNA molecules.

Particular embodiments refer to a method of isolating covalently closed circular (ccc) DNA molecules from microbial cells containing the ccc DNA molecules, comprising the steps of:
a) contacting the microbial cells with a lysing agent and moving the composition through a tube system with a flow having a Reynolds number of 4000-5500 to obtain a lysing composition;
b) incubating the lysing composition to obtain a lysate and moving the composition through a tube system with a flow having a Reynolds number of 2500-5400;
c) contacting the lysate with a neutralizing solution to obtain a neutralized lysate; and moving the composition through a tube system with a flow having a Reynolds number of at least 4500 to 6500;
d) further processing the neutralized lysate to obtain the ccc DNA molecules.

The composition is moved through the tube system, typically comprising a mixing tube, by ordinary means, i.e. by a controllable pump.

In specific embodiments the diameter of the tube system in step a), i.e. the mixing tube is in the range of from 2 to 50 mm, preferably in the range of from 4 to 40 mm. Typically, the flow in step a) has a flow rate in the range of from 0.3 to 1.5 m/s, preferably in the range of from 0.5 to 1.5 m/s.

Step b): Lysis

The lysis step is typically an alkaline lysis step, in which the detergent contained in the lysing agent disrupts the cell membranes. Further, the strong base contained in the lysing agent denatures both chromosomal and ccc DNA. In the following neutralization step the neutralizing solution, i.e. an acidic solution, is added that allows the renaturation of the ccc DNA but not of the chromosomal DNA of the microbial organism.

Typically, during step b) the lysing composition is moved through a tube system, i.e. the lysis tube. The moving of the lysing composition is controlled by ordinary means, i.e. a controllable pump. Step b) starts when the lysing composition enters the lysis tube and ends before the lysate is contacted with a neutralizing solution (i.e. step c).

Preferably step b) lasts 2 to 6 minutes, more preferably 3 to 6 minutes.

The lysing composition is moved through the tube system with a flow having a flow rate in the range of from 0.05 to 1 m/s, preferably in the range of from 0.1 to 0.5 m/s.

Typically, the diameter of the tube system in step b) is in the range of from 2 to 50 mm, preferably in the range of from 5 to 30 mm.

In some embodiments in step b) Reynolds number is at least 2100, preferably 2100 to 6000, more preferably 2500 to 5500.

Step c): Neutralization

In step c) the lysate contacted with a neutralizing solution for neutralization.

A mentioned above addition of the neutralizing solution allows the renaturation of the ccc DNA but not of the chromosomal DNA of the microbial organism.

The neutralizing solution is an acidic solution. Preferably the neutralizing solution contains an acetate buffer, e.g. potassium acetate or ammonium acetate. As further example also a combination of potassium acetate or ammonium acetate might be used. More preferably the neutralizing solution potassium acetate (e.g. in the range of 1000-5000 mM, more preferably in the range of 2000 to 4000 mM, such as 3000 mM).

Typically the lysate and the neutralizing solution are contacted via a Y-link in the tube system.

During step c) the lysate may be moved through a tube system, i.e. the neutralization tube. Typically, the diameter of the tube system in step c) is in the range of from 2 to 60 mm, preferably in the range of from 4 to 52 mm.

In some embodiments, the lysate is moved through the tube system with a flow having a flow rate in the range of from 0.3 to 1.5 m/s, preferably in the range of from 0.5 to 1.5 m/s.

After contacting the lysate with the neutralizing solution, the neutralized lysate may be pumped into a collection tank.

In some embodiments in step c) the Reynolds number is at least 3000, preferably of 3500 to 6500, more preferably, of 4000 to 6100.

Step d) Further Processing

Step d) may contain one or several of the following processing steps in arbitrary order:
- Alluvial filtration
- Ultrafiltration/diafiltration
- Anion exchange chromatography
- Precipitation
- Hydrophobic interaction chromatography Alluvial Filtration Combination of a filter aid of high permeability and filter sheets of low porosity are recommended. The addition of filter aid material to the lysate may be in solid form or as suspension. The dimensions of filtration devices are selected accordingly in order to allow an efficient lysate clearance. Following lysis the lysate may be pumped into a reservoir filter aid material. The mixture of lysate and filter aid material is clarified by alluvial filtration, employing or example a filter having a retention rate of 0.5 to 12 μm, preferably of 3 to 12 μm. Typically, the filter aid material is diatomaceous earth.

Ultrafiltration/Diafiltration

Typically, the ultrafiltration and diafiltration that may be directly subsequent to the alluvial filtration may be conducted as tangential flow filtration. In specific embodiment a hollow fiber filter module is used. Typically, a constant shear rate of 2000 $s^{-1}$ to 8000 $s^{-1}$, preferably of 4000 $s^{-1}$ to 6000 $s^{-1}$ is applied. The filtration is divided in a first concentration phase, i.e. ultrafiltration. In the concentration step the sample may be concentrated by a factor of ~5 to ~50, preferably ~6 to ~30, more preferably ~7 to 20.

In the diafiltration step (5×) the buffer is exchanged (20 mM Tris, 10 mM EDTA, 666 mM NaCl, pH 8.0) After the diafiltration, the retentate may be collected. The hollow fiber module may be washed and the wash fraction may be combined with the retentate for further processing.

Precipitation with Earth Alkali Salt

Preferably the earth alkali salt is calcium salt.

TFF (Diafiltration) (5×)

After precipitation with earth alkali salt, preferably a calcium salt a further diafiltration step may be carried out for exchanging the buffer in preparation of the following AEX chromatography.

Optionally: Anion Exchange Chromatography

The anion exchange chromatography may be carried out in the binding mode, i.e. the ccc DNA molecule binds to the resin and is eluted after at least one washing step employing. For the wash step an alkaline wash buffer may be employed.

The anion exchange resin may be a weak or strong anion exchange resin, preferably a strong anion exchange resin, such as quaternary amine or quaternary polyethyleneimine (e.g. Poros 50 HQ, Thermo Fisher).

The ccc DNA molecule may be eluted by a gradient elution or by a step gradient, preferably by a step gradient.

Hydrophobic Interaction Chromatography Thiophilic Interaction Chromatography

Further hydrophobic interaction chromatography and/or thiophilic interaction chromatography may be carried out. The hydrophobic interaction chromatography or thiophilic interaction chromatography may be carried out after addition of potassium phosphate or ammonium sulphate. Preferably the potassium phosphate is $K_2HPO_4$ and a further filtration step is optional.

Preferably the hydrophobic interaction chromatography is performed using an aromatic resin, such as Capto Phenyl ImpRes (GE Healthcare).

Optionally: Ultrafiltration Diafiltration

A final Ultrafiltration/diafiltration step may be carried out as tangential flow filtration. In some embodiments a hollow fiber module may be used.

After Ultrafiltration/diafiltration a material may be filtered (0.2 μm) and stored.

In a preferred embodiment step d) comprises the following steps in the following sequence
- (i) Alluvial filtration 1
- (ii) Ultrafiltration 1/diafiltration1
- (iii) Precipitation
- (iv) Alluvial filtration 2/diafiltration 2
- (v) Optionally Anion exchange chromatography
- (vi) Hydrophobic interaction chromatography
- (vii) finalization of product according to project-specific requirements In more detail, in specific embodiments step d) comprises the following steps
- (i) Alluvial filtration using diatomaceous earth
- (ii) Ultrafiltration/diafiltration using a hollow fiber tangential flow filtration module
- (iii) Precipitation with earth alkali salt
- (iv) Alluvial filtration using diatomaceous earth and diafiltration
- (v) Optionally Anion exchange chromatography, wherein during the AEX chromatography the ccc DNA molecules bound to the AEX resin are washed with an alkaline wash buffer
- (vi) Hydrophobic interaction chromatography using an aromatic resin In a specific embodiment, after all processing steps (i) to (v) in step d) are performed, a yield of 10% to 50%, preferably of 15% to 45%, more preferably of 20 to 40% can be achieved.

The method may be carried out in large scale. The term "large scale" refers to fermentation scale of 10 l and more, such as 100 l, 200 l, 500 l, 800 l, 1000 l or more.

Ccc DNA molecules obtained by the methods as described herein are also encompassed.

Experiments

Results:

Using the following workflow outlined below in detail and applying different Reynold numbers the yield after the lysis step was measured.

TABLE 1

Comparison of different Reynolds numbers applied in the lysis tube.

| Reynolds number | flow rate [mL/min] | % Lysis yield | Homogeneity |
|---|---|---|---|
| 1000 | 190 | 70% | 95% |
| 2300 | 450 | 81% | 95% |
| 3100 | 580 | 77% | 95% |

TABLE 1-continued

Comparison of different Reynolds numbers applied in the lysis tube.

| Reynolds number | flow rate [mL/min] | % Lysis yield | Homogeneity |
|---|---|---|---|
| 4000 | 750 | 92% | 95% |
| 5000 | 950 | 94% | 95% |
| 5500 | 1050 | 88% | 95% |
| 6200 | 1150 | 79% | 95% |

Methods:

As outlined in section 2 the overall process flow is divided into two parts, the upstream process consisting of seed fermentation, main fermentation, and fermentation harvest, and the downstream process including cell lysis, lysate clearance and conditioning, chromatographic purification steps, and a final TFF for bulk conditioning. All unit operations are outlined in detail in the following sections.

Upstream Process

Exemplary, a batch and a fed-batch fermentation strategy is applied for pDNA production. The fermentation concept follows a generic process flow (FIG. 1) starting from *E. coli* DH10B as preferred cell source. According to process-related requirements, a fed-batch fermentation strategy is optional for pDNA production.

Batch Fermentation

Seed Fermentation in Shake Flask

The components of the seed fermentation medium "Batch" are described in Table 2. The kanamycine solution as well as the thiamine-HCl and magnesium sulphate solution are prepared separately and added to the basic medium after sterilization and before start. The basal seed medium "Batch" is sterilized by autoclaving whereas the thiamine-HCl/MgSO$_4$ and the antibiotic are sterile-filtered.

TABLE 2

Composition of the Seed Fermentation Medium

| | substance | concentration [g/L] |
|---|---|---|
| solution 1 | glycerol | 25 |
| | yeast extract | 60 |
| | NaCl | 2.5 |
| | K$_2$HPO$_4$ | 1.75 |
| | KH$_2$PO$_4$ | 1.50 |
| solution 2 | kanamycine | 50 mg/L |
| solution 3 | thiamine-HCl | 10 mg/L |
| | MgSO$_4$ × 7H$_2$O | 2 g/L |

Key process parameters for seed fermentation in shake flask and related set-points are given in Table 3.

TABLE 3

Key Process Parameter for Seed Fermentation "Batch"

| Parameter Set-Point | Parameter Set-Point |
|---|---|
| Medium | Table 2 |
| Inoculum [%] | 0.1 |
| Agitation [rpm] | 200 ± 20 rpm |
| Temperature [° C.] | 30-39° C |
| Target OD600 | 1-3 |

Main Fermentation "Batch"

The composition of the main fermentation medium is listed in Table 4. The basal main fermentation medium "Batch" is prepared and autoclaved. The kanamycin solution as well as the thiamine-HCl/MgSO$_4$ solution are prepared individually, sterile-filtered and added to the sterile basal medium separately before main fermentation start.

TABLE 4

Composition of the Main Fermentation Medium

| | substance | concentration [g/L] |
|---|---|---|
| solution 1 | glycerol | 50 |
| | yeast extract | 60 |
| | NaCl | 2.5 |
| | K$_2$HPO$_4$ | 1.75 |
| | KH$_2$PO$_4$ | 1.50 |
| | glycine | 0.15 |
| | glutamine | 0.15 |
| | aspartate | 0.15 |
| | isoleucine | 0.15 |
| | proline | 0.15 |
| | PPG | 0.2 |
| solution 2 | kanamycine | 50 mg/L |
| solution 3 | thiamine-HCl | 10 mg/L |
| | MgSO$_4$ × 7H$_2$O | 2 g/L |

Key process parameters for the main fermentation "Batch" and related set-points are given in Table 5.

TABLE 5

Key process parameters for the main fermentation "Batch"

| Parameter | Parameter Set-Point |
|---|---|
| Medium | Medium refer to Table |
| Adjusting | 1M H$_3$PO$_4$ |
| Solutions | 25% (NH$_4$)OH |
| | PPG |
| Temperature [° C.] | 30-39° C |
| pH [—] | 7.0 ± 0.2 |
| Aeration [vvm] | 0.75 vvm; 7.5 L/min; 450 L/h |
| pO$_2$ [%] | ≥30 |

Depending on the cultivated *E. coli* strain the main fermentation is carried out at 30 to 39° C. (aeration of 7.5 L/min, pO2≥30% and with an initial stirrer speed of 300 rpm). Throughout main fermentation the pH is controlled at pH7.0±0.2 with 1 M phosphoric acid and 25% (NH$_4$)OH. As anti-foaming agent PPG is used. A control cascade is implemented which initially affects the stirrer rate and subsequently the enrichment of the inlet air flow with oxygen. The End of fermentation is indicated by a sharp increase of dissolved oxygen ("pO2 peak"). With detection of the pO2 peaks and consumption of the substrate the end of the fermentation is reached and the cell harvest is initiated.

Fed-Batch Fermentation

Seed Fermentation in Shake Flask

The components of the seed fermentation medium "Fed-Batch" are described in Table 6. The thiamine-HCl and magnesium sulphate solution are prepared separately and added to the basic medium after sterilization and before start. The basal seed medium "Fed-Batch" is sterilized by autoclaving whereas the thiamine-HCl and MgSO$_4$ are sterile-filtered.

TABLE 6

Composition of the Seed Fermentation Medium

|  | substance | concentration [g/L] |
|---|---|---|
| solution 1 | glycerol | 25 |
|  | yeast extract | 60 |
|  | NaCl | 2.5 |
|  | $K_2HPO_4$ | 1.75 |
|  | $KH_2PO_4$ | 1.50 |
| solution 2 | thiamine-HCl | 10 mg/L |
|  | $MgSO_4 \times 7H_2O$ | 2 g/L |

Key process parameters for seed fermentation in shake flask and related set-points are given in Table 7.

TABLE 7

Key Process Parameter for Seed Fermentation "Fed-Batch"

| Parameter Set-Point | Parameter Set-Point |
|---|---|
| Medium | Table 6 |
| Inoculum [%] | 0.1 |
| Agitation [rpm] | 200 ± 20 rpm |
| Temperature [° C.] | 30-39° C |
| Target OD600 | 1-3 |

Main Fermentation "Fed-Batch"

The composition of the main fermentation medium is listed in Table 8. The basal main fermentation medium "Fed-Batch" is prepared and autoclaved. The thiamine-HCl and the $MgSO_4$ solution are prepared individually, sterile-filtered and added to the sterile basal medium separately before main fermentation start.

TABLE 8

Composition of the Main Fermentation Medium

|  | substance | concentration [g/L] |
|---|---|---|
| solution 1 | glycerol | 5 |
|  | yeast extract | 20 |
|  | NaCl | 2.5 |
|  | $K_2HPO_4$ | 1.75 |
|  | $KH_2PO_4$ | 1.50 |
|  | PPG | 0.2 |
| solution 2 | thiamine-HCl | 10 mg/L |
|  | $MgSO_4 \times 7H_2O$ | 2 g/L |

The composition of the feed medium is listed in Table 9. The feed medium is prepared and filtered (0.2 µm).

TABLE 9

Composition of the Feed Medium

|  | substance | concentration [g/L] |
|---|---|---|
| solution 1 | glycerol | 600 |
|  | yeast extract | 150 |
|  | $K_2HPO_4$ | 5.3 |
|  | $KH_2PO_4$ | 2.0 |

Key process parameters for the main fermentation "Fed-Batch" and related set-points are given in Table 10.

TABLE 10

Key process parameters for the main fermentation "Fed-Batch"

| Parameter | Parameter Set-Point |
|---|---|
| Medium | Medium refer to Table 8 |
| Adjusting | 1M $H_3PO_4$ |
| Solutions | 25% $(NH_4)OH$ |
|  | PPG |
| Temperature [° C.] | 30-39° C |
| pH | 7.0 ± 0.2 |
| Agitation [rpm] | 300-1200 rpm |
| Aeration [vvm] | 0.75 vvm-1.2 vvm; (7.5 L/min; 450 L/h ) |
| Pressure [bar] | 0-0.8 bar |
| $pO_2$ [%] | ≥30 |

Depending on the cultivated *E. coli* strain the main fermentation is carried out at 30 to 39° C. (aeration of 7.5 L/min, pO2≥30% and with an initial stirrer speed of 300 rpm). Throughout main fermentation the pH is controlled at pH7.0±0.2 with 1 M phosphoric acid and 25% $(NH_4)OH$. As anti-foaming agent PPG is used. A control cascade is implemented which initially affects the stirrer rate and subsequently the inlet air flow is raised followed by an increase of the pressure. The End of the batch phase is indicated by a sharp increase of dissolved oxygen ("pO2 peak")—the pre-determined exponential feed profile starts immediately, see Equation 1. With transition to the stationary phase without any further cell growth or when the pO2<5% because the maximum of the pO2-cascade is attained the end of the fermentation is reached and the cell harvest is initiated.

Calculation of the pre-determined exponential feed profile   Equation 1

$$F = \frac{(\mu_w * V_{L0} * c_{XL})}{(Y_{X/S} * c_S)} * e^{(\mu*(t-t_0))}$$

F=feed flow rate [mL/h]
$\mu_w$=set point for growth rate [$h^{-1}$]
$V_{L0}$=liquid reactor volume at feeding start [mL]
$C_{XL}$=cell dry weight at feeding start [g/mL]
$Y_{X/S}$=yield coefficient substrate/biomass [g/g]
$C_S$=concentration of carbon source in feeding solution [g/mL]
t=process time [h]
$t_0$=time at feed start [h]

Fermentation Harvest

Cell harvest is performed by applying classical centrifugation. The harvested cells are stored as solid pellet(s) or biomass. Key process parameter for fermentation harvest are given in Table 11.

TABLE 11

Harvest Centrifugation

| Parameter |  | Set-value |
|---|---|---|
| g-force | x g | 9.200 |
| Time | Min | 20 |
| Temperature | ° C. | 4 |

Downstream Process

The RH/pDNA downstream process consists of eleven main Unit operations. Cell lysis and plasma release is based on alkaline lysis. Lysate is clarified and further purified by the addition of $CaCl_2$ followed by TFF conditioning to enable AEX Capture. Subsequent to AEX Capture chromatography, potassium phosphate or ammonium sulphate is added to the AEX pool to allow HIC binding. The clarified feed Stream is loaded onto the HIC polishing column. pDNA in the HIC eluate may finally be buffer exchanged by TFF or micro-filtered according to project-specific requirements. The bulk is (usually) stored at s −70° C.

Lysis

Figure 2:
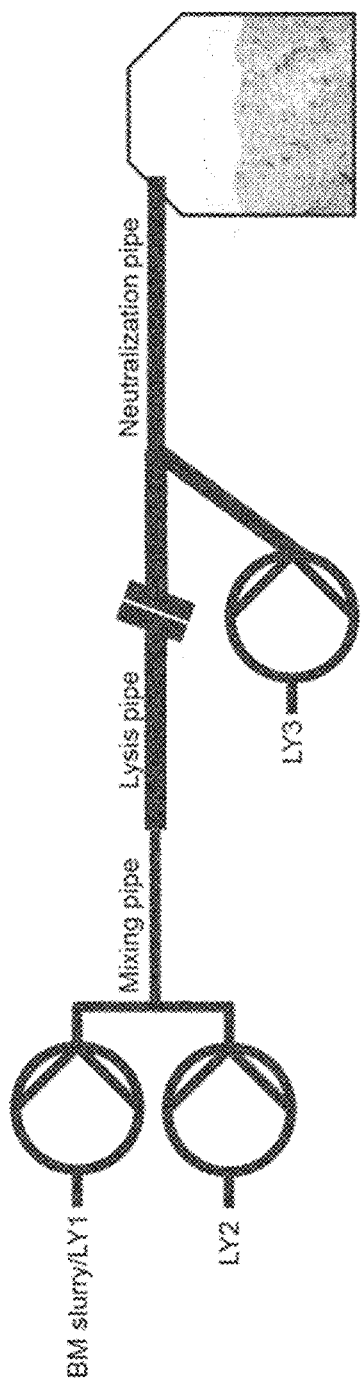

FIG. 2 shows a lyse module. The microbial cells in buffer solution (25 or 50 mM Tris-HCL, 10 mM EDTA; pH 8.0) are contacted with the lysing buffer (0.8% (w/v) NaOH, 1% (w/v) SDS) in the mixing tube. This lysing composition is incubated in the lysis tube. Then the lysate is contacted with the neutralization solution (3M KAc, pH5.5 or 1 M KAc+3 M ($NH_4$) Ac, or 7M CH3COONH4, 1 M KAc) in the neutralization tube. The buffers LY1 (25 or 50 mM Tris-HCl, 10 mM EDTA; pH 8.0), LY2 (0.8% (w/v) NaOH, 1% (w/v) SDS), and LY3 (3 M KAc, pH 5.5 or 3M CH3COONH4, 1 M KAc, or 7M CH3COONH4, 1 M KAc) are used for the alkaline lysis step. Key process parameter for lysis are given in Table 12.

TABLE 12

Key Process Parameter for Lysis

| Parameter | Set-Point |
|---|---|
| Biomass concentration | 100 g/L |
| Reynolds number | 4000-6000 |
| Lysis time | 3-6 min |

Dependent on the main fermentation scale different lysis set-ups are used for cell lysis (for details on tubing dimensions refer to Table 13)

TABLE 13

| Parameter | Unit | A | B | C | D |
|---|---|---|---|---|---|
| Fermentation scale | L | 3-100 | 50-400 | 200-1000 | 500-2000 |
| LY1 tube | | | | | |
| Tubing inner diameter (ID) | mm | 4.8 | 9.6 | 19.1 | 38 |
| Pump rate | L/h | 36 | 72 | 144 | 288 |
| LY2 tube | | | | | |
| Tubing ID | mm | 4.8 | 9.6 | 19.1 | 38 |
| Pump rate | L/h | 36 | 72 | 144 | 288 |
| LY3 tube | | | | | |
| Tubing ID | mm | 6.4 | 12.7 | 25.4 | 51 |
| Pump rate | L/h | 36 | 72 | 144 | 288 |
| Lysis "mixing" tube | | | | | |
| Tubing ID | mm | 4.8 | 9.6 | 19.1 | 38 |
| Lysis tube | | | | | |
| Tubing ID | mm | 10.0 | 19.1 | 38 | 80 |
| Neutralization "mixing" tube | | | | | |
| Tubing ID | mm | 6.4 | 12.7 | 25.4 | 51 |
| Neutralization tube | | | | | |
| Tubing ID | mm | 9.6 | 15.9 | 32 | 64 |

The cell lysis step starts with thawing of the EOF biomass/EOF biomass slurry. The thawed EoF biomass/EOF biomass slurry is adjusted to a biomass concentration of 100 g/L with lysis buffer LY1. The actual lysis step is initiated pumping the homogeneous biomass slurry (LY1) and lysis buffer LY2 to a T-link where both biomass and LY2 buffer are mixed. A turbulent flow at a calculated Reynolds number of 4000-6000 is achieved in the mixing tube (FIG. 2). Downstream the mixing tube the lysis tube is directly coupled. Flow rate and lysis tube dimension determine lysis time to be in range of 3-6 min. At the end of the lysis tube the neutralization buffer LY3 is mixed with the lysate over a Y-link. The neutralized lysate is conveyed through the neutralization tube into a collecting tank.

Lysate Clearance:

Lysate clearance is performed by standard techniques as described in the prior art, preferably by an alluvial filtration step (using diatomaceous earth as filter aid material). A suitable clearance step is e.g. described in Eibl, R., Eibl, D. (Eds.) "Single-Use Technology in Biopharmaceutical Manufacture", 2nd Ed., 2019 John Wiley & Sons, Inc., pp. 271-77. Combination of a filter aid of high permeability and filter sheets of low porosity are recommended. The addition of filter aid material to the lysate might be in solid form or as suspension. The dimensions of filtration devices are selected accordingly in order to allow an efficient lysate clearance.

TFF 1 Lysate Conditioning

The lysate matrix is exchanged into DF1 buffer (20 mm Tris, 10 mM EDTA 666 mM NaCl; pH 8.0±0.1) by means of TFF to enable pDNA binding to the AEX Capture resin. Key process parameter for diafiltration 1 harvest are given in Table 14.

TABLE 14

Key Process Parameter for Ultra-/Diafiltration 1

| Parameter | Set-Point |
|---|---|
| TFF module | |
| Membrane type | PES |
| Fiber length [cm] | 41.5 |
| Fiber ID [mm] | 0.5/1.0 |
| NMWC [kDa] | 100/300 |
| Buffer DF1 | Refer to Table 24 |
| Shear rate | 4000-6000 s-1 |
| TMP | ≈0.5 bar |

With view of the main fermentation scale different TFF modules are used for lysate conditioning

TABLE 15

TFF Modules for Ultra-/Diafiltration 1

| Parameter | A | B | C | D |
|---|---|---|---|---|
| Fermentation scale [L] | 3-100 | 50-400 | 200-1000 | 500-2000 |
| TFF module Membrane area [m2] | 0.16 (1 × 0.16) | 2.6 (1 × 2.6) | 2.6 (1 × 2.6) | 15.6 (6 × 2.6) |

The TFF for lysate conditioning is conducted with a hollow fiber module. The TFF is performed at a constant shear rate of 4000-6000 s−1 and a TMP of ~0.5 bar. The TFF is divided into a first concentration phase and a following diafiltration phase. The TFF is carried out in two subbatches: the clarified lysate is divided in two with each batch being concentrated by a factor of 20. The retentates are pooled and the pooled lysate matrix is exchanged 5-fold to DF1 buffer in a continuous diafiltration. Post diafiltration the retentate is collected and the hollow fiber module is rinsed in one wash step. Retentate and wash fractions are pooled for further processing.

CaCl$_2$—Precipitation

The DF-pool is conditioned to 800 mM CaCl$_2$ (with a 5 M CaCl$_2$-stock solution) and stirred for 10 minutes. Subsequently, the solution is stored overnight at 2-8° C.

TFF 2 Lysate Conditioning: Diafiltration 2

The cleared CaCl$_2$) precipitate is exchanged 5-fold into DF1 buffer (20 mm Tris, 10 mM EDTA 666 mM NaCl; pH 8.0±0.1) by means of TFF to enable pDNA binding to the AEX Capture resin. Key process parameters for diafiltration 2 (Hollow fibre, buffer) are identical to TFF1. Following diafiltration, the herewith conditioned sample is directly applied as Capture Load for AEX Chromatography.

AEX Capture Chromatography

The conditioned lysate is directly loaded to an AEX Capture chromatography column (Resin: Poros 50 HQ, bed height: 15-25 cm; max pDNA Load 6-7 g/L$_{cv}$).

TABLE 16

AEX Capture Column

| Parameter | A | B | C | D |
|---|---|---|---|---|
| Fermentation scale [L] | 3-100 | 50-400 | 200-1000200 | 500-2000 |
| Column ID [cm] | 5.0 | 20 | 25 | 60 |
| Area [cm$^2$] | 19.6 | 314 | 491 | 2827 |
| CV [L] | 0.29-0.45 | 4.7-7.8 | 7.4-12.3 | 42-71 |

The AEX column is equilibrated with AXA (20 mM Tris-HCl, 10 mM EDTA, 666 mM NaCL; pH 8.0±0.1) at 150 cm/h prior to feed stream loading. Feed stream is loaded at 60 cm/h. Post loading the AEX column is rinsed with buffer AXA for five column volumes (CV) at 150 cm/h.

Product elution is achieved by a step elution at 800 mM NaCl in 5 CV (buffers AXA/AXB: 20 mM Tris-HCl, 10 mM EDTA, 1 M NaCL; pH 8.0±0.1) at 60 cm/h. The eluted product is collected and suitable fractions are pooled.

HIC Polishing Chromatography

The AEX pool is mixed with potassium phosphate stock (4 M K$_2$HPO$_4$, 10 mm Tris-HCl, pH 8.0±0.1) to adjust to a K$_2$HPO$_4$ concentration of 2.0 M. Alternatively, 3.0 M ammonium sulphate may be taken to increase the salinity of the AEX pool to a final concentration of ≥2.0 M ammonium sulphate. The feed stream is filtered again prior to HIC loading (Sartopore 2 0.45/0.2 µm, Sartorius). Key process parameter for HIC Polishing are given in Table 17.

TABLE 17

Key Process Parameter for HIC Polishing Chromatography

| Parameter | Set-Point |
|---|---|
| Resin | Capto Phenyl ImpRes |
| Bed-hight [cm] | 15-25 |
| Max. pDNA Load [g/Lcv] | 3 |

Dependent on the main fermentation scale different column dimensions are used for HIC chromatography:

TABLE 18

HIC Polishing Column

| Parameter | A | B | C | D |
|---|---|---|---|---|
| Fermentation scale [L] | 3-100 | 50-400 | 200-1000 | 500-2000 |
| Column ID [cm] | 5.0 | 20 | 25 | 60 |
| Area [cm$^2$] | 19.6 | 314 | 491 | 2827 |
| CV [L] | 0.29-0.49 | 4.7-7.8 | 7.4-12.3 | 42-71 |

The HIC polishing column (Resin: Capto Phenyl ImpRes, BH: 15-25 cm) is equilibrated with buffer HIA (2.0 M K$_2$HPO$_4$, 10 mM Tris-HCL, pH 8.0), or the alternative equilibration buffer (2160 mM (NH$_4$)$_2$SO$_4$, 20 m Tris-HCl, 10 mM EDTA, pH 7.0). Feed stream loading is performed at a linear flow rate of 150 cm/h. Following loading the HIC column is rinsed with 5 column volumes HIA buffer at 150 cm/h. Product elution may be achieved by a linear gradient in 7.5 CV to 1.5 M K$_2$HPO$_4$ or at 1.62 M ammonium sulphate (buffer HIA/HIB: 10 mM Tris-HCL, pH 8.0, or alternatively 20 mM Tris-HCl, 10 mM EDTA, pH 7.0) and a hold at 1.5 M K$_2$HPO$_4$ or 1.62 M ammonium sulphate for 6 CV prior to 100% B. Alternatively also step elution could be applied. The entire chromatography is accomplished with 150 cm/h.

Alternatively, the process can be performed without the initial AEX step. Then the cleared lysate is mixed with 3 M ammoniumsulphate, 10 mM EDTA, 20 mM Tris, pH 7.0 (Adjustment with 25% HCl) to a final concentration of 2.16 M for conditioning. and is filtered with filtration capsules (e.g. PALL P700 and Supracap 100) or by alluvial filtration prior to HIC loading.

Key process parameter for HIC are given in Table 18.

TABLE 18

Key Process Parameter for HIC Polishing Chromatography in process without preceding AEX

| Parameter | Set-Point |
|---|---|
| Resin | Capto Phenyl ImpRes |
| Bed-hight [cm] | 20 |
| Max. pDNA Load [g/Lcv] | 5 |

The HIC column (Resin: Capto Phenyl ImpRes, BH: 20 cm) is equilibrated with 5 column volumes buffer HIA (A: 2.16 M Ammoniumsulfat, 20 mM Tris, 10 mM EDTA, pH 7.0 (adjusted with 25% HCl) and 150 cm/h. Feed stream loading is performed at a linear flow rate of 75 cm/h. Following loading the HIC column is rinsed with 5 column volumes HIA buffer at 150 cm/h. Product elution is achieved with a linear gradient of 0-20% B (buffer HIA/HIB: B: 20 mM Tris, 10 mM EDTA, pH 7.0 for 7.5 column volumes at 38 cm/h and a hold at 20% B for 6 column volumes at 38 cm/h followed by a step to 100% B for 2 column volumes at 150 cm/h Final process steps may include Ultra-Diafiltration 3:

Ultra-/Diafiltration 3

In a final TFF step the HIC elution matrix may be exchanged into project specific DF2 buffer. A hollow fiber module (membrane: PES, NMWCO: 100 kDA, fiber ID: 0.5 mm, fiber length: 41.5 cm) may be assigned for TFF conditioning (shear rate 4000-6000 s−1; TMP=0.5 bar).

Dependent on the main fermentation scale different TFF modules are used for lysate conditioning:

TABLE 19

| Parameter | A | B | C | D |
|---|---|---|---|---|
| Fermentation scale [L] | 3-100 | 50-400 | 200-1000 | 500-2000 |
| TFF Module Membrane Area [m2] | 0.0235 (1 × 0.0235) | 0.16 (1 × 0.16) | 0.32-0.54 (2 × 0.16-1 × 0.54) | 2.6 (1 × 2.6) |

The TFF can be performed at a constant shear rate of 4000-6000 s−1. The HIC eluate is first concentrated to a pre-defined target concentration. Subsequently, the lysate matrix is exchanged to DF2 buffer in a continuous diafiltration. Post diafiltration the retentate is collected and the hollow fiber module is rinsed in one wash steps. Retentate and wash fractions are pooled.

Optional: Filtration Bulk

Bulk material post UF/DF 3 is 0.2 μm filtered and stored.

Buffers

TABLE 20

Composition of Lysis Buffer LY1

| Substance | Concentration [mM] |
|---|---|
| Tris | 25 or 50 |
| EDTA | 10 |
| 25% HCl | Adj. Target pH |
| pH | 8.0 |

TABLE 21

Composition of Lysis Buffer LY2

| Substance | (w/v) |
|---|---|
| SDS | 1% |
| NaOH | 0.8% |

TABLE 22

Composition of Lysis Buffer LY3

| Substance | |
|---|---|
| Potassium acetate | 3000 mM |
| pH | 5.5 |

TABLE 23

Composition of the alternative Lysis Buffer LY3

| Substance | |
|---|---|
| Ammonium acetate | 3000 mM |
| Potassium acetate | 1000 mM |

TABLE 23.1

Composition of the alternative Lysis Buffer LY3

| Substance | |
|---|---|
| Ammonium acetate | 7000 mM |
| Potassium acetate | 1000 mM |

TABLE 24

Composition of Diafiltration Buffer DF1

| Substance | |
|---|---|
| Tris | 20 mM |
| EDTA | 10 mM |
| NaCl | 666 mM |
| 25% HCl | Adj. Target pH |
| pH | 8.0 |

TABLE 25

Composition of AEX Running Buffer AXA

| Substance | |
|---|---|
| Tris | 20 mM |
| EDTA | 10 mM |
| NaCl | 666 mM |
| 25% HCl | Adj. Target pH |
| pH | 8.0 |

TABLE 26

Composition of AEX Running Buffer AXB

| Substance | |
|---|---|
| Tris | 20 mM |
| EDTA | 10 mM |
| NaCl | 1000 mM |
| 25% HCl | Adj. Target pH |
| pH | 8.0 |

TABLE 27

Composition AEX CIP Buffer AXCIP1

| Substance | |
|---|---|
| NaOH | 1000 mM |
| NaCl | 3000 mM |

TABLE 28

Composition of AEX CIP Buffer AXCIP2

| Substance | |
|---|---|
| GuHCL | 6000 mM |

TABLE 29

Composition of HIC Conditioning Buffer

| Substance | |
|---|---|
| Tris | 10 mM |
| $K_2HPO_4$ | 4000 mM |
| 25% HCl | Adj. Target pH |
| pH | 8.0 |

TABLE 30

Composition of HIC Running Buffer HIA (Equilibration buffer)

| Substance | |
|---|---|
| Tris | 10 mM |
| $K_2HPO_4$ | 2000 mM |
| 25% HCl | Adj. Target pH |
| pH | 8.0 |

TABLE 31

Composition of HIC Running Buffer HIB

| Substance | |
|---|---|
| Tris | 10 mM |
| 25% HCl | Adj. Target pH |
| pH | 8.0 |

TABLE 32

Composition of the alternative HIC Conditioning Buffer

| Substance | |
|---|---|
| Tris | 20 mM |
| $(NH_4)_2SO_4$ | 3000 mM |
| pH | 7.0 |

TABLE 33

Composition of the alternative HIC Running Buffer HIA (Equilibration buffer)

| Substance | |
|---|---|
| Tris | 20 mM |
| $(NH_4)_2SO_4$ | 2160 mM |
| EDTA | 10 mM |
| 25% HCl | Adj. Target pH |
| pH | 7.0 |

TABLE 34

Composition of the alternative HIC Running Buffer HIB

| Substance | |
|---|---|
| Tris | 20 mM |
| EDTA | 10 mM |
| 25% HCl | Adj. Target pH |
| pH | 7.0 |

TABLE 35

Composition of HIC Conditioning Buffer for HIC-chromatography without AEX

| Substance | |
|---|---|
| Tris | 10 mM |
| $(NH_4)_2SO_4$ | 3000 mM |
| EDTA | 10 mM |
| 25% HCl | Adj. Target pH |
| pH | 7.0 |

TABLE 36

Composition of the respective HIC Running Buffer HIA (Equilibration buffer)

| Substance | |
|---|---|
| Tris | 20 mM |
| $(NH_4)_2SO_4$ | 2160 mM |
| EDTA | 10 mM |
| 25% HCl | Adj. Target pH |
| pH | 7.0 |

TABLE 37

Composition of the respective HIC Running Buffer HIB (Elution buffer)

| Substance | |
|---|---|
| Tris | 20 mM |
| EDTA | 10 mM |
| 25% HCl | Adj. Target pH |
| pH | 7.0 |

In the exemplary data set out below, the parameters are as indicated above, except indicated otherwise:

TABLE 38 alternative plasmid sizes and respective USP yields with *E. coli* DH10B

| Plasmid size | 200 L | 10 L |
|---|---|---|
| 9.4 kb | 166 mg/L | 164 mg/L |
| 5.3 kb | 40 mg/L | 50 mg/L |
| 6.5 kb | 59 mg/L | 93 mg/L |

TABLE 39 lysis set-ups dependent on the main fermentation scale

| Parameter | Unit | E | F | G |
|---|---|---|---|---|
| Fermentation scale | L | 10 | 200 | 1000 |
| Biomass total | kg | 1.5 | 30 | 150 |
| tube lysis-mixing | | | | |
| Tubing inner diameter (ID) | mm | 4.8 | 9.6 | 38.0 |
| Pump rate | ml/min | 600 | 1200 | 4800 |
| Reynolds number | (—) | 5295 | 5295 | 5250 |
| Tube lysis | | | | |
| Tubing ID | mm | 10.0 | 19.0 | 80.0 |
| Reynolds number | (—) | 2541 | 2675 | 2541 |
| Duration | s | 210 | 210 | 210 |

TABLE 39-continued lysis set-ups dependent on the main fermentation scale

| Parameter | Unit | E | F | G |
|---|---|---|---|---|
| Tube neutralisation | | | | |
| Tubing ID | mm | 6.4 | 12.7 | 25.4 |
| Pump rate | ml/min | 600 | 1200 | 4800 |
| Reynolds number | | 5956 | 6003 | 5980 |

TABLE 40

Quality after DSP process including AEX

| Parameter | Unit | F | G |
|---|---|---|---|
| Fermentation scale | L | 10 | 200 |
| | kb | 7.4 | 7.4 |
| Content | mg/ml | 0.94 | 0.93 |
| Homogeneity (ccc-monomer) | % | 95.8 | 97.4 |
| Residual genomic DNA | % w/w Plasmid | <1 (0.5) | <1 (0.1) |
| Residual RNA | % w/w Plasmid | <1 (0.1) | <1 (0.03) |
| Residual HCP | % w/w Plasmid | <1 (0.01) | <1 (0.01) |
| Endotoxin | EU/mg | <10 | <10 |

TABLE 41

Quality after DSP without AEX

| Paramter | Unit | values |
|---|---|---|
| USP Scale | L | 10 |
| Plasmid Size | kb | 6.1 |
| pDNA Content | Mg/mL | 0.502 |
| Homogeneity % (ccc monomer) | % | 96.4 |
| residual gDNA | pg/mL | <150060 |
| residual RNA | µg/mL | <0.3 |
| Endotoxin | EU/mL | <0.1 |

The application further contains the following items:

Item 1. Method of isolating covalently closed circular (ccc) DNA molecules from microbial cells containing the ccc DNA molecules, comprising the steps of:
   a) contacting the microbial cells with a lysing agent and moving the composition through a tube system with a flow having a Reynolds number of at least 3000 to obtain a lysing composition;
   b) incubating the lysing composition to obtain a lysate;
   c) contacting the lysate with a neutralizing solution to obtain a neutralized lysate; and
   d) further processing the neutralized lysate to obtain the ccc DNA molecules.

Item 2. Method of producing ccc DNA molecules in microbial cells, comprising the steps of:
   (i) fermenting microbial cells containing the ccc DNA molecules;
   (ii) harvesting the microbial cells;
   a) contacting the microbial cells with a lysing agent and moving the composition through a tube system with a flow having a Reynolds number of at least 3000 to obtain a lysing composition;
   b) incubating the lysing composition to obtain a lysate;
   c) contacting the lysate with a neutralizing solution to obtain a neutralized lysate; and
   d) further processing the neutralized lysate to obtain the ccc DNA molecules.

Item 3. Method according to item 1 or 2, wherein in step a) the composition is moved through a tube system with a flow having a Reynolds number of at least 3300, preferably of 3500 to 6000, more preferably, of 4000 to 5500.

Item 4. Method according to any one of items 1 to 3, wherein step b) lasts 6 minutes or less.

Item 5. Method according to any one of the preceding items, wherein step b) lasts 2 to 6 minutes, preferably 3 to 6 minutes.

Item 6. Method according any one of the preceding items wherein in steps b) and c) the Reynolds number is at least 2100.

Item 7. Method according any one of the preceding items wherein in step b) the Reynolds number is at least 2100, preferably 2100 to 6000, more preferably 2500 to 5500.

Item 8. Method according to any one of the preceding items wherein in step c) the Reynolds number is at least 3000, preferably of 3500 to 6500, more preferably, of 4000 to 6100.

Item 9. Method according to any one of the preceding items, wherein step d) comprises filtering the neutralized lysate by at least one filtration step.

Item 10. Method according to item 9, wherein in step d) an alluvial filtration step is performed, preferably using diatomaceous earth.

Item 11. Method according to item 10, wherein in step d) ultrafiltration/diafiltration step is performed, wherein preferably the ultrafiltration/diafiltration filter is a hollow fiber filter.

Item 12. Method according to any one of the preceding items, wherein step d) comprises adding earth alkali salt to the neutralized lysate.

Item 13. Method according to item 12, wherein earth alkali salt is calcium salt, preferably calcium chloride.

Item 14. Method according to item 13, wherein after the addition of the earth alkali salt a tangential flow filtration step is performed.

Item 15. Method according to any one of the preceding items, wherein step d) comprises performing anion exchange (AEX) chromatography.

Item 16. Method according to item 15, wherein the AEX chromatography is performed in the binding mode.

Item 17. Method according to item 15 or 16, wherein during the AEX chromatography the ccc DNA molecules bound to the AEX resin are washed with an alkaline wash buffer.

Item 18. Method according to any one of items 15 to 17, wherein during the AEX chromatography a step gradient is used for eluting the ccc DNA molecules.

Item 19. Method according to any one of the preceding items, wherein step d) comprises adding potassium salt or ammonium salt to the neutralized lysate.

Item 20. Method according to item 16, wherein the potassium salt is potassium phosphate and the ammonium salt is ammonium sulphate.

Item 21. Method according to any one of items 1 to 14, 19 and 20, wherein the method does not comprise performing anion exchange (AEX) chromatography.

Item 22. Method according to any one of items 1 to 14, 19 to 21, wherein step d) does not comprise performing anion exchange (AEX) chromatography.

Item 23. Method according to any one of the preceding items, wherein step d) comprises performing hydrophobic interaction chromatography or thiophilic interaction chromatography.

Item 24. Method according to item 23, wherein the hydrophobic interaction chromatography is performed using an aromatic resin.

Item 25. Method according to item 24, wherein after the hydrophobic interaction chromatography a further ultrafiltration/diafiltration step is performed.

Item 26. Method according to any one of the preceding items, wherein the diameter of the tube system in step a) is in the range of from 2 to 50 mm, preferably in the range of from 4 to 40 mm.

Item 27. Method according to any one of the preceding items, wherein in step b) the lysing composition is moved through a tube system.

Item 28. Method according to item 27, wherein the diameter of the tube system in step b) is in the range of from 2 to 50 mm, preferably in the range of from 5 to 30 mm.

Item 29. Method according to any one of the preceding items, wherein during step c) the lysate is moved through a tube system.

Item 30. Method according to item 29, wherein the diameter of the tube system in step c) is in the range of from 2 to 60 mm, preferably in the range of from 4 to 52 mm.

Item 31. Method according to any one of the preceding items, wherein the flow in step a) has a flow rate in the range of from 0.3 to 1.5 m/s, preferably in the range of from 0.5 to 1.5 m/s Item 32. Method according to any one of items 26 to 30, wherein step b) the lysing composition is moved through the tube system with a flow having a flow rate in the range of from 0.05 to 1 m/s, preferably in the range of from 0.1 to 0.5 m/s.

Item 33. Method according to any one of items 29 to 32, wherein in step c) the lysate is moved through the tube system with a flow having a flow rate in the range of from 0.3 to 1.5 m/s, preferably in the range of from 0.5 to 1.5 m/s.

Item 34. Method according to any one of the preceding items, wherein in step a) the composition has a viscosity in the range of 1.2-1.3 mm$^2$/s (Capillary Viscometer Method according to Ph.Eu. 9.8, chapter 2.2.9).

Item 35. Method according to any one of the preceding items, wherein the ccc DNA molecule is selected from the group consisting of plasmid, cosmid, bacterial artificial chromosome (BAC), bacteriophage, viral vector or hybrids thereof.

Item 36. Method according to item 30, wherein the ccc DNA molecule is a plasmid.

Item 37. Method according to any one of the preceding items, wherein the ccc DNA molecule has a size in the range of 2 kbp to 20 kbp.

Item 38. Method according to any one of the preceding items, wherein the microbial cell is a bacterial, preferably a gram negative bacterial cell.

Item 39. Method according to any one of the preceding items, wherein the microbial cell is *E. coli*.

Item 40. Method according to any one of the preceding items, wherein the lysing agent comprises NaOH and SDS.

Item 41. Method according to any one of the preceding items, wherein the neutralizing solution comprises an acetate buffer, preferably potassium acetate, or ammonium acetate and potassium acetate.

Item 42. Method according to any one of the preceding items, wherein the yield of ccc DNA molecules is at least 65% after step c).

Item 43. Method according to any one of the preceding items, wherein the homogeneity of the ccc DNA molecules obtained from step c) is at least 70% ccc, preferably 80%, more preferably 90% ccc.

Item 44. Method according to any one of the preceding items, wherein the method is performed at large scale.

Item 45. Ccc DNA molecules obtained by the method of any of items 1 to 43.

The invention claimed is:

1. A method of isolating covalently closed circular (ccc) DNA molecules from microbial cells containing the ccc DNA molecules, comprising the steps of:
   a) contacting the microbial cells with a lysing agent and moving the composition through a tube system with a flow having a Reynolds number of at least 3000 to obtain a lysing composition;
   b) incubating the lysing composition, which comprises moving the lysing composition through a tube system with a flow having a Reynolds number of at least 2100, to obtain a lysate;
   c) contacting the lysate with a neutralizing solution to obtain a neutralized lysate; and
   d) further processing the neutralized lysate to obtain the ccc DNA molecules.

2. The method according to claim 1, wherein in step a) the composition is moved through a tube system with a flow having a Reynolds number of at least 3300.

3. The method according to claim 1, wherein step c) comprises moving the neutralized lysate through a tube system with a flow having a Reynolds number of at least 2100.

4. The method according to claim 1, wherein in step b) the Reynolds number is 2100 to 6000.

5. The method according to claim 3, wherein in step c) the Reynolds number is at least 3000.

6. The method according to claim 1, wherein step b) lasts 6 minutes or less.

7. The method according to claim 1, wherein step d) comprises filtering the neutralized lysate by at least one filtration step.

8. The method according to claim 1, wherein step d) does not comprise performing anion exchange (AEX) chromatography.

9. The method according to claim 1, wherein the diameter of the tube system in step a) is in the range of from 2 to 50 mm.

10. The method according to claim 1, wherein in step b) the lysing composition is moved through a tube system, wherein the diameter of the tube system in step b) is in the range of from 2 to 50 mm.

11. The method according to claim 1, wherein during step c) the lysate is moved through a tube system.

12. The method according to claim 11, wherein the diameter of the tube system in step c) is in the range of from 2 to 60 mm.

13. The method according to claim 1, wherein the flow in step a) has a flow rate in the range of from 0.3 to 1.5 m/s.

14. The method according to claim 10, wherein step b) the lysing composition is moved through the tube system with a flow having a flow rate in the range of from 0.05 to 1 m/s.

15. The method according to claim 1, wherein the ccc DNA molecule is selected from the group consisting of plasmid, cosmid, bacterial artificial chromosome (BAC), bacteriophage, viral vector or hybrids thereof, wherein the ccc NDA molecule is preferably a plasmid.

16. The method according to claim 1, wherein the yield of ccc DNA molecules is at least 65% after step c) and/or wherein the homogeneity of the ccc DNA molecules obtained from step c) is at least 70% ccc.

17. The method according to claim 1, wherein in step a) the composition is moved through a tube system with a flow having a Reynolds number of at least 3500 to 6000.

18. The method according to claim 1, wherein in step a) the composition is moved through a tube system with a flow having a Reynolds number of 4000 to 5500.

19. The method according to claim 3, wherein in step c) the Reynolds number is 3500 to 6500.

20. The method according to claim 1, wherein the flow in step a) has a flow rate in the range of from 0.5 to 1.5 m/s.

\* \* \* \* \*